(12) United States Patent
Pasquier et al.

(10) Patent No.: US 11,270,860 B2
(45) Date of Patent: Mar. 8, 2022

(54) SELF-SUPPORTED ACTUATION DEVICE FOR AN ELECTROMECHANICAL SWITCH

(71) Applicant: SAFT, Levallois-Perret (FR)

(72) Inventors: Eric Pasquier, Saint-Benoit (FR); Benoit Morillon, Poitiers (FR)

(73) Assignee: SAFT, Levallois-Perret (FR)

( * ) Notice: Subject to any disclaimer, the term of this patent is extended or adjusted under 35 U.S.C. 154(b) by 296 days.

(21) Appl. No.: 16/471,157

(22) PCT Filed: Feb. 8, 2017

(86) PCT No.: PCT/FR2017/050288
§ 371 (c)(1),
(2) Date: Jun. 19, 2019

(87) PCT Pub. No.: WO2018/115604
PCT Pub. Date: Jun. 28, 2018

(65) Prior Publication Data
US 2020/0006029 A1 Jan. 2, 2020

(30) Foreign Application Priority Data

Dec. 22, 2016 (FR) ...................................... 1663257

(51) Int. Cl.
*H01H 79/00* (2006.01)
*H01H 71/12* (2006.01)
(Continued)

(52) U.S. Cl.
CPC .......... *H01H 79/00* (2013.01); *H01H 71/122* (2013.01); *H01H 71/20* (2013.01);
(Continued)

(58) Field of Classification Search
CPC ........ H01H 79/00; H01H 71/12; H01H 71/20; H01H 71/122; H01M 10/42;
(Continued)

(56) References Cited

U.S. PATENT DOCUMENTS 5,362,576 A * 11/1994 Clark ..................... H01H 61/00
429/7
6,073,914 A 6/2000 Roth et al.
(Continued)

FOREIGN PATENT DOCUMENTS

FR 2 902 232 A1 12/2007
JP 05-005236 U 1/1993

OTHER PUBLICATIONS

International Search Report for PCT/FR2017/050288 dated Sep. 10, 2018 [PCT/ISA/210].

*Primary Examiner* — Richard Isla
*Assistant Examiner* — Dung V Bui
(74) *Attorney, Agent, or Firm* — Sughrue Mion, PLLC (57) ABSTRACT

The invention relates to a self-supported activation device for an electromechanical switch, which can be used for the isolation of a faulty element of a battery, comprising a set of electrically connected elements. The activation device (1) is intended to activate switching in a switching device (2) of the type having electrical contact means (3) that can move between first and second electrical positions. The activation device comprises a current sensor (6a, 6b), a retaining element (7), and at least two movable elements (8, 9) solidly connected to a coil (10). When a current is detected by the current sensor (6a, 6b) the activation device can move from a non-activation configuration, in which the movable elements are retained by the retaining element in a first position intended to prevent the movement of the contact means of a switching device, into an activation configuration, in which the movable elements are no longer retained in the first position by the retaining element and instead occupy a second position intended to allow the movement of the contact means of a switching device. The coil (10) comprises a passage space for at least part of the contact means, and each of the movable elements can rotate about an axis (Continued)

such as to clear the passage space, in the aforementioned second position, while remaining solidly connected to the coil.

22 Claims, 5 Drawing Sheets

(51) Int. Cl.
  *H01H 71/20* (2006.01)
  *H02H 7/18* (2006.01)
  *H01M 10/42* (2006.01)
(52) U.S. Cl.
  CPC ..... *H01M 10/425* (2013.01); *H01M 10/4207* (2013.01); *H02H 7/18* (2013.01); *H01M 2010/4271* (2013.01)

(58) Field of Classification Search
  CPC ........... H01M 10/4207; H01M 10/425; H01M 2010/4271; H01M 2010/4207; H02H 7/18
  USPC .......................................................... 320/116
  See application file for complete search history.

(56) References Cited

U.S. PATENT DOCUMENTS

| | | | |
|---|---|---|---|
| 6,249,063 B1* | 6/2001 | Rudoy | H01H 71/20 307/125 |
| 8,247,929 B2* | 8/2012 | Pasquier | H01H 71/20 307/139 |
| 2001/0026687 A1 | 10/2001 | Kosaka et al. | |
| 2007/0212189 A1 | 9/2007 | Naitou | |
| 2010/0005913 A1 | 1/2010 | Baghdasarian | |
| 2013/0169038 A1* | 7/2013 | King | H02J 7/0031 307/10.1 |

* cited by examiner

SELF-SUPPORTED ACTUATION DEVICE FOR AN ELECTROMECHANICAL SWITCH

CROSS REFERENCE TO RELATED APPLICATIONS

This application is a National Stage of International Application No. PCT/FR2017/050288 filed Feb. 8, 2017, claiming priority based on French Patent Application No. 1663257 filed Dec. 22, 2016.

BACKGROUND OF THE INVENTION

Field of the Invention

The invention relates to a self-supported actuation device for an electromechanical switch, and a switch provided with such a device. It finds an application in particular for bypassing or isolating a defective cell of a battery comprising a set of electrically connected cells, for example a battery comprising one or more cells of the lithium-ion type such as the batteries used in the aeronautical or space field.

Background Art

In a battery containing one or more cells connected in series, it may happen that one of the cells becomes defective, such as through having increased resistance right up to going open circuit and/or exhibiting heavy self-discharge. In such a case, continued use of the battery is likely to damage the defective cell, and in the case of a battery comprising several cells, to negatively impact the healthy cells, and thus to quickly render the battery unusable.

In effect, overcharging occurs in the event of increased resistance of the defective cell, if the charge current of this defective cell is not sufficiently bypassed (e.g. by a balancing circuit in parallel with the cell) in order to avoid exceeding the end-of-charge voltage threshold on this defective cell while waiting for the healthy cells to arrive at their end-of-charge voltage threshold for a full charge.

Alternatively, over-discharge/in the version occurs in the event of heavy self-discharge of this defective cell, if the charge current of the healthy cells is not sufficiently bypassed (by the balancing circuit) to enable the defective cell to arrive at its end-of-charge voltage threshold for full charge.

The impact of continuation of use of the battery with a defective cell on the other healthy cells of this battery can therefore be direct (the level of charge of the healthy cells becomes increasingly incomplete) or indirect as a consequence of the behavior of the defective cell (overheating; pressure buildup, operation of the circuit breaker of one or more cells when the battery is fitted with one, setting up an open circuit in the battery's series circuit, relatively violent circuit breaking).

When such a failure of a cell is detected, the defective cell can be replaced by a healthy cell, which involves accessing the battery and interrupting use thereof for a longer or shorter period of time, together with the provision of electrical power to the circuit to which it is connected. In order to reduce the duration of the interruption of electrical power supply, the battery with the defective cell can be replaced by a battery in good condition, over the period of time needed to carry out the replacement of the defective cell.

However, this always involves accessing the battery, meaning high maintenance costs. The problem of battery access is a major problem in applications in which this battery is on-board a device or system that is difficult to access. This is the case in particular in space applications, for example for providing electrical energy for the circuits of a satellite.

It is therefore important to be able to isolate or bypass a defective cell, in order to be able to continue using the battery without risking damaging the other cells.

For this purpose, a bypass or shunting device may be used, in which an actuator activates a switching device for isolating one of the battery cells when a fault is detected on that cell.

There are known, for example, switching devices such as those described in FR 2,902,232 (=U.S. Pat. No. 8,502,636) or in FR 2,776,434 (=U.S. Pat. No. 6,249,063).

Such a device comprises an actuation device and a movable part forming contact means comprising in particular a plunger that can move inside a cylindrical body between two distinct electrical contact positions when activated by the actuation device. By suitably connecting a cell of a multi-cell battery to the electrical contacts of the switching device, the cell can be bypassed by switching the switching device from one to the other of the two electrical contact positions. Switching is obtained by the actuation device which, in the non-switched position, retains a distributor member of the contact means in the first electrical contact position. When a failure at the cell in question is detected, by auxiliary detection means, an electric current is supplied to the actuation device which releases the plunger. This is then moved to the second electrical contact position, thereby achieving the switching of the switching device and thus bypassing the defective cell.

The actuation device relies, for its part, on a coil in which movable members or jaws are mounted and held by a retaining wire wound around the coil. The retaining wire is connected to a current sensor. When a sufficiently strong current is received by the current sensor, the retaining wire melts in a manner of a fuse wire, thereby releasing the movable members or jaws which in turn free up the passage for the movement of the plunger of the switching device.

One of the problems posed by this type of device is that the movable members or jaws, once released, fall into the body of the switching device and remain free inside the switching device body. Further, these movable members or jaws and/or the coil may rotate within the device, thereby creating a risk of damage to the fuse wire.

Furthermore, there is no control of the place where the fuse wire can break. Depending on the location of the break, the release of the movable members or jaws may be less efficient, or even made impossible in particular if the breakage of the fuse wire is such that the retaining wire cannot escape.

Also, some metal parts, in particular the plunger, the retaining wire, the coil, the movable members or jaws are at a floating electric potential before and/or after activation.

SUMMARY OF THE INVENTION

One of the aims of the invention is therefore to solve in particular the above-mentioned problems. The aim of the invention is, in particular, to provide a switching device and an actuation device for such a switching device, for isolating a defective cell of a multi-cell battery, which is more efficient, robust and reliable.

According to a first aspect, the invention provides an actuation device for activating the switching in a switching device of the type having electrical contact means movable between a first and a second electrical contact position.

The actuation device comprises a current sensor, a retaining member and at least two movable members integral with a coil, and is adapted to pass, when a current is sensed by the current sensor, from a non-activation configuration in which the movable members are held by the retaining member in a first position for preventing movement of the contact means of a switching device, to an activation configuration in which the movable members are no longer held by the retaining member in said first position and are in a second position for allowing movement of the contact means of the switching device.

The coil includes a through-space for at least a part of the contact means of the switching device, and the movable members are each movable in rotation about an axis so as to open up a passage, in said second position, into said through-space, while remaining integral with the coil.

In some embodiments, the actuation device further includes one or more of the following features, taken alone or in all technically possible combinations:

- the coil has an abutment region for each of the movable members, and in the first position, the movable members are maintained in abutment on their respective abutment regions by the retaining member.
- the two axes of the two movable members are formed by pins integral with the coil.
- the through-space is a through-space centered on the central axis of the coil, preferably substantially cylindrical, in that the two pins are arranged parallel to said through-space and mutually symmetrically with respect to said through-space, and in that the two movable members take the form of two jaw members such that during a changeover from the first position to the second position, the respective regions of the two jaw members furthest from the respective pins move away from each other to free up access to said through-space.
- the current sensor comprises a current-supply wire, and in that the retaining member is of a wire type, connected by one of its ends to said coil, wound around the movable members and connected by its other end to the current-supply wire of the current sensor by a fuse wire, in the first position such that when a current is sensed by the current sensor, the fuse wire melts and releases the corresponding end of the retaining member in order to allow the passage of the movable members to adopt the second position.
- the fuse wire exhibits a loop configuration.
- the fuse wire is connected, preferably via a connecting member, to the current-supply wire of the current sensor through the coil, and an electrically isolating member is interposed between, firstly, the assembly comprising the fuse wire, optionally the connecting member, the current-supply wire of the current sensor and, secondly, the coil.

The invention also provides, according to a second aspect, a switching device comprising a body in which contact means are accommodated movable in the body between a first and a second electrical contact position.

The switching device comprises an actuation device as discussed above, housed in the body, so as to enable, when the actuation device is in the activation configuration, displacement of the contact means from the first to the second electrical contact position.

In some embodiments, the actuation device further includes one or more of the following features, taken alone or in all technically possible combinations:

- the body has a longitudinal axis, the contact means extending longitudinally in the body, and in that the actuation device is arranged in the body such that the through-space for the at least one part of the contact means extends longitudinally.
- the contact means comprise a plunger able to move longitudinally in the through-space to displace the contact means from the first to the second electrical contact position.
- the switching device comprises resilient return means, such as a spring, which are connected, firstly, to the body, preferably via a force distribution member such as an annular force distribution member, and, secondly, to the contact means, the resilient return means being mounted in a relaxed position when the contact means are in the second position of electrical contact and in an active position when the contact means are in the first electrical contact position, so as to allow automatic passage of the contact means from the first to the second electrical contact position under the influence of the resilient return means from the active position thereof to the relaxed position thereof.
- the contact means include a distributor member connected to the plunger by an electrically non-conductive base, said distributor member being in contact with a first, and a second, electrical contact terminals in the first electrical contact position, and in contact with the second, and a third, electrical contact terminals in the second electrical contact position.
- an end of distributor member oriented in the direction of movement of said contact means from the first to the second electrical contact position, has a radially reduced profile with respect to a longitudinal axis of the body, so as to promote engagement of said distributor member with said third terminal, in contact therewith.
- the switching device comprises contact elements made of electrically conductive deformable material, arranged respectively in contact with the contact terminals, and in contact with said distributor member as a function of its movement from the first to the second electrical contact position to facilitate electrical contact between said distributor member and one or the other of said contact terminals.
- the diameter of the portion of the electrically non-conductive base facing the contact member in contact with the contact terminal, which is not in contact with distributor member in the first contact position, is adapted to cause said contact terminal, to adopt a self-centered position on the electrically non-conductive base and perpendicular to an axis of said contact means.
- the actuation device is arranged at one end of the body, said end being closed by a first cover.
- the first cover is provided with a clearance space into which a through-space in said coil of the actuation device opens, so as to allow said at least one part of the contact means of the switching device to pass through said actuation device right up and into said clearance space.
- the body is closed, at its end opposite the end closed by the first cover, by a second cover provided with a cavity, and in that the said distributor member is provided at its end facing the second cover, with a centering device which can be accommodated in said cavity of the second cover.
- the centering device is provided with cooperation means, such as a screw thread, capable of enabling co-operation with an assembly member to enable assembly of the contact terminals, on the distributor member without damaging the said contact elements and the moving of said contact means from the second to the first electrical contact position.

in the first contact position, in the second contact position, and during the changeover from the first to the second contact position, all the metal parts of said device are connected to one electrical potential.

According to a third aspect, the invention provides a device for isolating at least one determined cell of a battery which comprises a plurality of cells connected in series, said isolation device being adapted to be connected to said battery.

the device for isolating comprises a switching device as discussed above, to allow the switching device to pass from a first position, in which the determined cell is connected in series with other cells, to a second position, in which the determined cell is bypassed and is no longer connected in series with the other cells.

According to a fourth aspect, the invention provides a battery comprising one or more cells connected in series, provided with the above isolation device.

In this way, the invention makes it possible to bypass a defective cell of a multi-cell battery, by means of a robust, efficient and reliable switching device.

The features and advantages of the invention will become apparent upon reading the following description, given by way of non-limiting example, with reference to the following drawings.

DETAILED DESCRIPTION OF EMBODIMENTS

Figure 1:
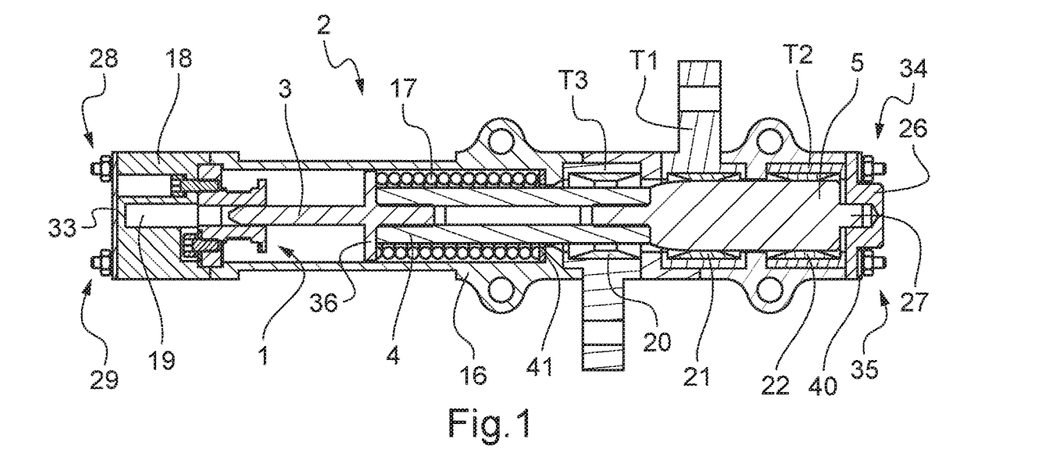
FIG. 1 is a diagrammatic representation of an example of a switching device according to the invention, comprising an example of an actuation device according to the invention, in longitudinal section and before activation.
Figure 2:
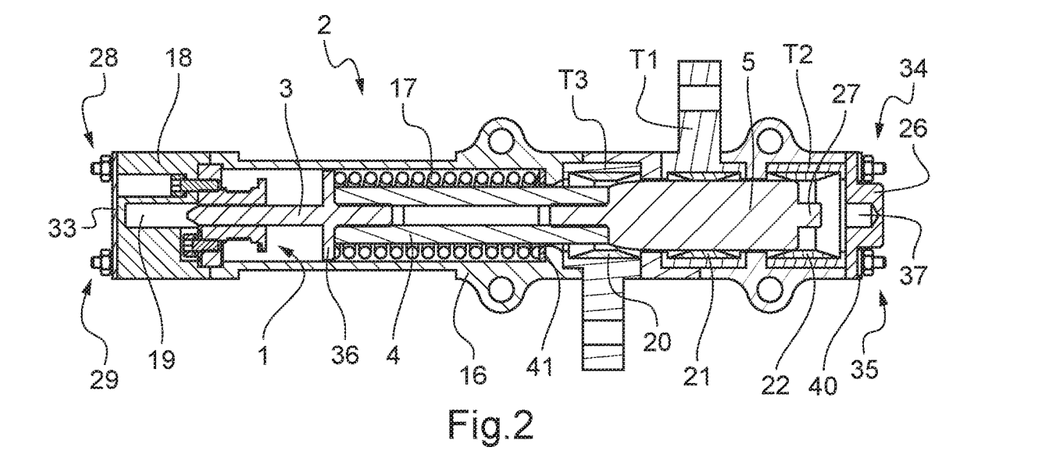
FIG. 2: diagrammatic representation of the switching device of FIG. 1, in longitudinal section and during activation.
Figure 3:
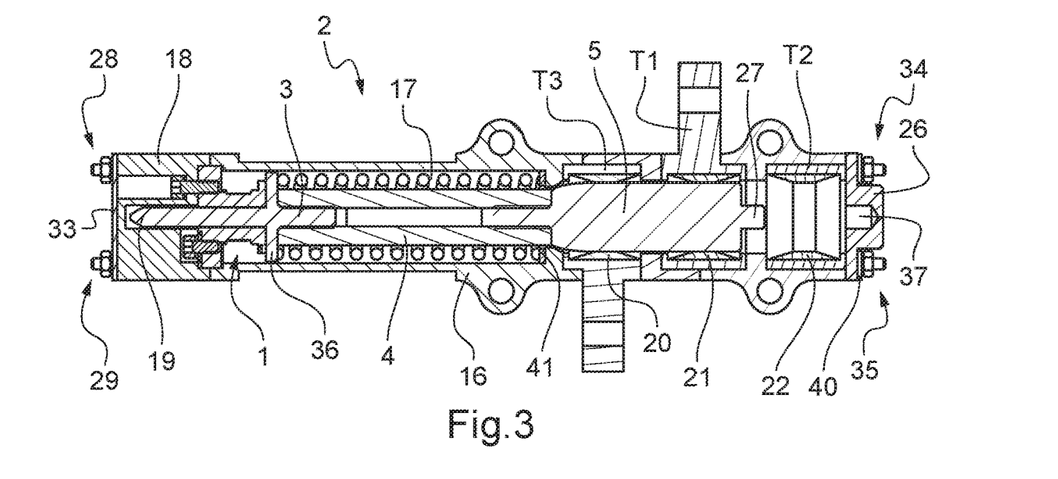
FIG. 3 is a diagrammatic representation of the switching device of FIG. 1, in longitudinal section and after activation.
Figure 4:
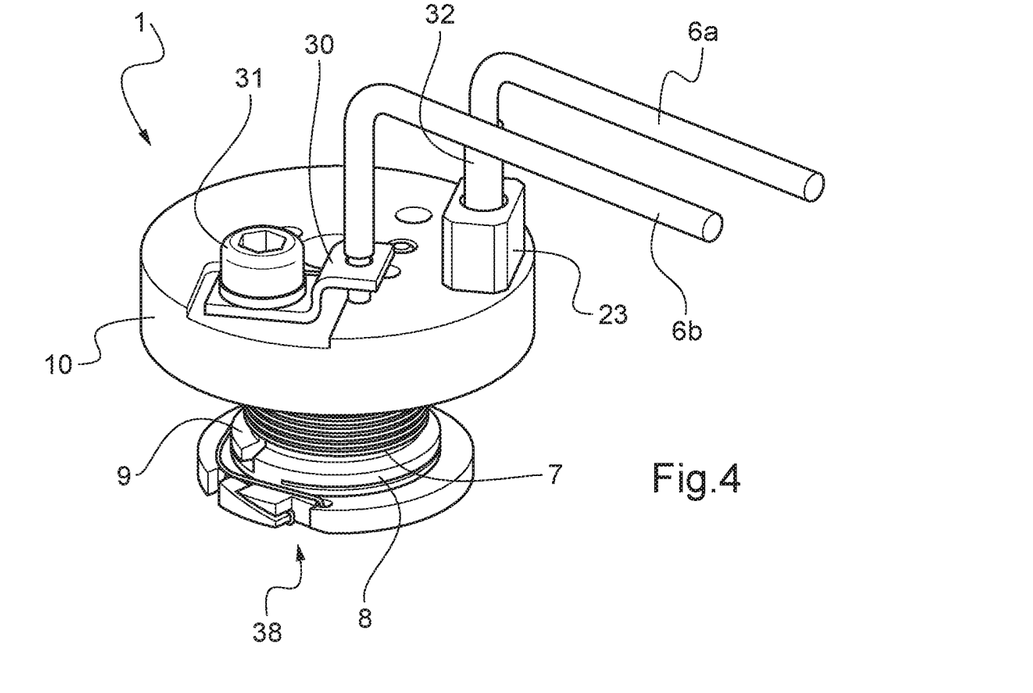
FIG. 4 is a diagrammatic representation of an example of an actuation device according to the invention, in perspective and before activation.

An example of a switching device 2 according to the invention, incorporating an actuation device 1 according to the invention is shown in FIGS. 1 to 3, in three different positions: position before activation (FIG. 1), intermediate position (FIG. 2), position after activation (FIG. 3).

The actuation device 1 is itself shown in more detail in FIGS. 4 to 9.

The switching device 2 comprises electrical contact means 3, 4, 5, movable between a first contact position T2T1 shown in FIG. 1, in which these contact means 3, 4, 5 are in contact with the two terminals T2 and T1.

After activation by actuation device 1, contact means 3, 4, 5 move towards the terminal T3, passing through the intermediate position shown in FIG. 2 (corresponding to the circuit diagram of FIG. 10B) in which contact means 3, 4, 5 are in contact, via distributor member 5, with terminals T1, T2 and T3 (corresponding to a switch configuration of the make-before-break or MBB type, i.e. a configuration in which connection T1T3 is closed before connection T2T1 is opened, i.e. in which the three contact terminals T1, T2 and T3 are electrically connected together, thereby avoiding any series circuit open circuit in a battery provided with the switching device 2, to arrive at the second contact position T1T3 shown in FIG. 3, in which the contact means 3, 4, 5 are in contact with the two terminals T1 and T3.

By connecting terminals T1, T2, T3 of the switching device 2 in an appropriate manner to terminals of the cells of a multi-cell battery, maintaining a determined cell connected in series with the other cells when contact means 3, 4, 5 are in the first contact position T2T1, and bypassing of the determined cell which is no longer connected in series with the other cells when contact means 3, 4, 5 are in the second contact position T1T3 is achieved.

Figure 10A:
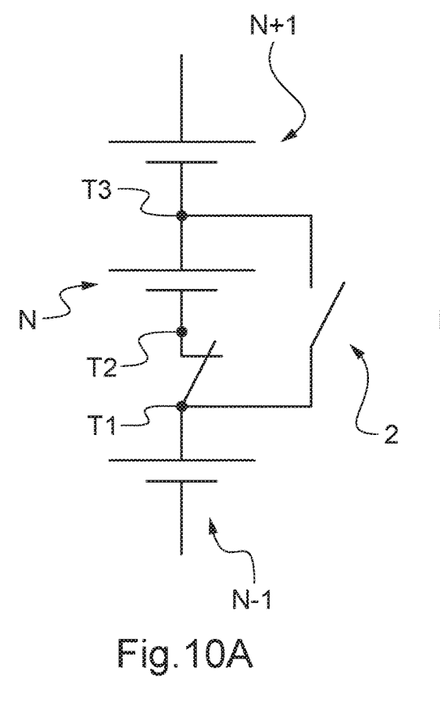
FIG. 10A is an electrical diagram of an example of a switching device according to the invention perpendicular to series cells of a battery before activation.
Figure 10B:
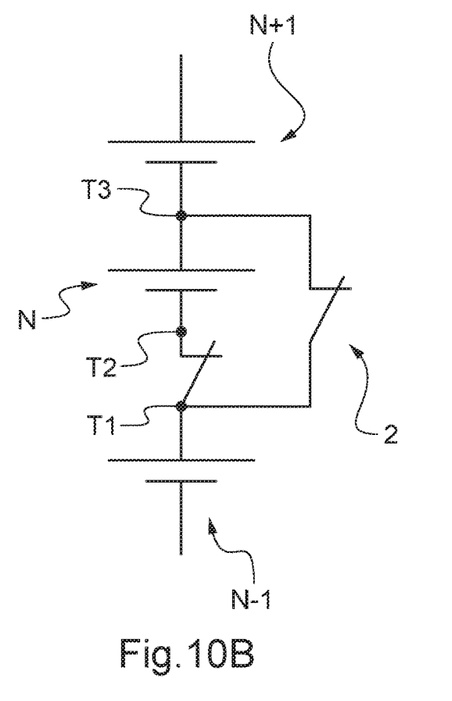
FIG. 10B is an electrical diagram of the example of the switching device according to the invention perpendicular to series cells of a battery, after activation thereof but during switching.
Figure 10C:
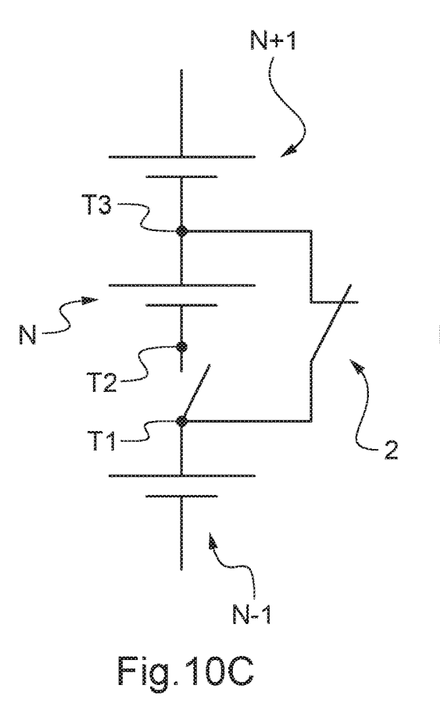
FIG. 10C is an electrical diagram of the example of the switching device according to the invention perpendicular to series cells of a battery, after activation and switching thereof.

For example, as shown in FIGS. 10A, 10B and 10C, if we consider a determined cell N connected in series between two cells N−1 and N+1, connecting the terminal T1 of the switching device 2 to the positive terminal of cell N−1, the terminal T2 of the switching device 2 to the negative terminal of cell N, and the terminal T3 of the switching device 2 to the positive terminal of cell N:

when the connection between terminals T1 and T2 is achieved (FIGS. 1 and 10A), that is, in the first contact position, cell N remains connected in series between cells N−1 and N+1;

as long as the connection between terminals T1 and T3 is set up while the connection between terminals T1 and T2 is not yet broken (FIGS. 2 and 10B), that is, in the intermediate contact position, cell N can still be connected in series between the cells N−1 and N+1 while having the possibility of having bypassing via T1T3 already set up, so as not to cause an open circuit in the series circuit of the battery;

and when connection between terminals T1 and T3 is set up while the connection in the first contact position between terminals T1 and T2 is no longer present (FIGS. 3 and 10C), cell N is no longer connected in series between cell N−1 and cell N+1 (but remains connected by its positive terminal to the negative terminal of cell N+1).

Figure 11:
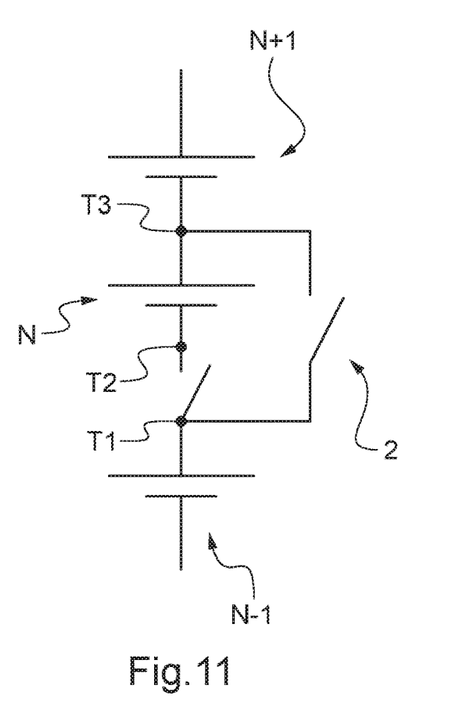
FIG. 11 is an electrical diagram of another example of a switching device according to the invention perpendicular to series cells of a battery, after activation but during switching.

It will be noted that in another embodiment of the switching device 2, not shown in the drawings as such but the circuit diagram for N−1, N, N+1 series cells of a battery of which is shown in FIG. 11, it is possible to obtain an intermediate position of this switching device 2, after activation and during switching, in a break-before-make or BBM position, in which the two connections T2T1 and T1T3 are simultaneously opened.

The above considerations also apply to the case of a battery comprising a single cell N. In this case, cell N is connected at T1 to one of the output terminals of the battery, and at T3 to the other of the output terminals of the battery. Switching to bypass cell N is then of interest not only to avoid damaging cell N in the event of a fault, as explained above, but also in particular in the case of a single cell battery that would be connected in series with one or more other batteries each comprising one or more other cells. When the single cell of the single-cell battery becomes defective, switching allows bypassing of this single defective cell, thus bypassing the defective battery, without the risks of impact on the cells of the other batteries as discussed above.

The switching device 2 can be integrated into an isolation device for connection to the battery. This isolation device can be connected to the input wire 6a of current sensor 6a, 6b. Thus, the activation of the switching device 2 will be obtained by delivering a current of determined value to current sensor 6a, 6b of actuation device 1. The isolation device can itself be triggered manually or automatically via a system for triggering the bypassing of one or the other of the battery cells, to which it is connected.

Optionally, this isolation device may also be connected to a system for detecting a fault in either one of the battery cells, such that when a fault in either of the battery cells is detected by the detection system, a signal is sent to an operator for manual triggering of the isolation device, or to the triggering system for automatic activation of the isolation device.

When a multi-cell battery is fitted with such an isolation device, it is thus possible to extend the service life of a battery in which one of the cells has become defective, without the need for manual intervention on the battery. Optionally, monitoring the state of the cells may be automated, as well as triggering the bypass of a defective cell.

The switching device 2 comprises a body 16 made of an insulating material, in which contact means 3,4,5, and actuation device 1 are accommodated.

As shown in the example in FIGS. 1 to 3, body 16 has a longitudinal axis and is closed at its respective ends by two covers 18 and 26. These covers 18 and 26 are fixed to the body 16 by securing means 28, respectively 34, 35. As shown in the drawings, two support plates 33, 40 can be interposed between the securing means 28, 29 and the cover 18, respectively between the securing means 34, 35 and the cover 26.

The contact means 3, 4, 5 therefore extend longitudinally inside the body 16, and move longitudinally between the two contact positions T2T1 and T1T3.

Contact means 3, 4, 5 comprise a plunger 3. Plunger 3 is in abutment against or inside actuation device 1 prior to activation of the actuation device 1 (FIG. 1), and then penetrates into a longitudinal through-space of actuation device 1 after activation thereof (FIG. 2), up to an end position (FIG. 3) referred to as the position for the end of switching.

In the example shown, the plunger 3 is provided, close to its rear end with respect to its travel after activation of the actuation device 1, with a radial extension 36 which effectively determines the extreme position after activation, as a result of abutment against the actuation device 1.

Resilient return means 17, such as a spring 17, are arranged so as to automatically bring the plunger 3 to the extreme position when the through-space in actuation device 1 becomes free, in other words after activation of actuation device 1. For this purpose, the resilient return means 17, which bear against a force distribution member 41 such as a washer for example, are connected, firstly, to the body 16, upstream of the stroke of plunger 3, and to the plunger 3 via radial extension 36 acting as an abutment (thrust) region, and therefore to the contact means 3, 4, 5.

In the example shown, resilient return means 17 are therefore in the rest position (the non-compressed or relaxed position), when the contact means 3, 4, 5 are in the second contact position T1T3, and in the active position (or working position, with the resilient means compressed), when the contact means 3, 4, 5 are in the first contact position T2T1.

Thus, the resilient return means 17 ensure the automatic passage of the contact means 3, 4, 5 from the first contact position T2T1 to the second contact position T1T3, once actuation device 1 is activated, as a result of resilient return means 17 shifting from the working position to the rest position.

Distributor member 5, acting as an electrical contact member of contact means 3, 4, 5 is connected to the plunger 3 via a non-electrically conductive base 4.

Distributor member 5 is adapted to come into contact with at least two of the contact terminals T1, T2, T3 of switching device 2; in the first contact position T2T1, distributor member 5 is in contact with the contact terminals T1 and T2, thereby setting up an electrical connection between these two terminals, as shown in FIGS. 1 and 10A. In the second contact position T1T3, distributor member 5 is in contact with contact terminals T1 and T3, thus making the electrical connection between these two terminals, as in FIGS. 3 and 10C.

As mentioned above with reference to FIGS. 2 and 10B, it will be noted that there may be an intermediate position placing the switching device in a make-before-break position in which distributor member 5, after activation and during switching, can be in contact with contact terminals T1, T2 and T3, thereby setting up an electrical connection between these three terminals, and avoiding any possibility of an open circuit on the series circuit of the battery during switching.

As can be seen in FIGS. 1 to 3, but more specifically in FIG. 2, the end of distributor member 5 at the plunger end thereof, in other words oriented in the direction of movement of contact means 3, 4, 5 from the first electrical contact position T2T1 to the second electrical contact position T1T3, has a radially reduced profile with respect to the longitudinal axis of the body 16. This profile facilitates engagement of distributor member 5 in contact with contact terminal T3.

Preferably, a contact element 20, 21, 22 made of electrically conductive deformable material, such as a strip carrying contact studs, is disposed in contact with, and inwardly of each contact terminal T3, T1, T2, to facilitate electrical contact between distributor member 5 and contact terminals T3, T1, T2, as well as the translational movement of distributor member 5.

As shown, body 16 is closed at one of its ends, in which the actuation device 1 is arranged, by a cover 18. In order to allow the passage of the plunger 3 right up to the extreme position after activation of the actuation device 1, a clearance space in the form of a bore 19 into which the space for passage of the plunger opens into actuation device 1, is provided in the cover 18.

At the opposite end of the body 16, cover 26 also closes body 16. Cover 26 is provided with a cavity 37 which can be seen in FIGS. 2 and 3, for receiving a centering device 27 formed in the end of distributor member 5 oriented towards the cover 26, when contact means 3, 4, 5 are in the first contact position T2T1.

The male-female cooperation between centering device 27 and cavity 37 in the cover 26 is one possible embodiment, but other embodiments to achieve centering which is equivalent are also possible (e.g. reversal of the male-female cooperation).

Centering device 27 participates in the alignment of the parts as well as the radial positioning of the movable contact means 3, 4, 5. In particular, centering device 27 makes it possible to limit radial oscillations when mechanical stresses such as vibrations or shocks are present. This makes it possible in particular to relieve stresses on contact elements 20, 21, 22 which are already subject to radial contact forces. This is the case more specifically, in the first contact position, between contact terminal T1, contact element 21 and distributor member 5, between contact terminal T2, contact element 22 and distributor member 5, and optionally between contact terminal T3, contact element 20 and the electrically non-conductive base 4, and in the second contact position, between contact terminal T1, contact element 21 and distributor member 5, and between contact terminal T3, contact element 20 and distributor member 5. This also makes it possible to guarantee the power carrying resistance of contact means 3, 4, 5

In order to facilitate the assembly of switching device 2, in particular the active positioning of resilient return means 17, it is possible to provide, in centering device 27, co-operating means adapted to cooperate with an assembly member, in such a way that, once they cooperate, it is possible to act on the assembly member in order to move the contact means 3, 4, 5 and bring them from the second contact position T1T3 to the first contact position T2T1. These means of cooperation in centering device 27 can for example consist of a thread on the periphery of centering device 27, allowing a suitable assembly tool to be screwed onto the thread. This assembly tool may have a radially reduced profile upstream and downstream of the direction of movement of contact means 3, 4, 5 from the first to the second contact position, substantially similar to the radially reduced profile of distributor member 5, thus facilitating engagement with distributor member 5 as well as recall thereof to below contact terminals T1 and T2.

It is advantageous to adapt the diameter of the portion of the electrically non-conductive base 4 which is located facing contact element 20 associated with (therefore in contact with) contact terminal T3 which is not in contact with distributor member 5 in the first contact position, such that contact terminal T3 is self-centered (assembly of type centered-sliding-bearing), the bearing character making it possible to avoid any phenomenon of swiveling of contact terminal T3 under its own weight in its housing which allow a certain degree of play, of body 16) with respect to electrically non-conductive base 4 on the one hand, and perpendicular to the axis of contact means 3, 4, 5 on the other hand.

Thus, introducing and mounting of switching device 1 onto a battery are facilitated and do not impact the configuration of the assembly, thereby guaranteeing electrical functionality (resistance of the power circuit) and mechanical functionality (movement of distributor member) of the device are maintained.

An example of an actuation device 1 according to the invention is shown in greater detail in FIGS. 4 to 9, designed to be integrated (FIG. 4), or already integrated (FIGS. 5 to 9) into a switching device 2 as shown in FIGS. 1 to 3.

Actuation device 1 comprises a current sensor 6a, 6b, two movable members 8, 9, or jaws 8, 9 held integral with a coil 10 by a wire-type retaining member 7 in the example.

The current sensor 6a, 6b comprises a wire or cable 6a supplying current penetrating through the coil 10, insulated therefrom via an electrically insulating member 23, and connected to the retaining member 7. Cable 6a is specific to each switching device equipping one and the same battery. Current sensor 6a, 6b also comprises a return wire or cable 6b electrically connected to the coil 10, for example by means of a conductive tab 30 fixed to the coil 10 by a securing means 31. Cable 6b can be common to all the switching devices equipping the same battery.

The two movable members 8, 9 are therefore, in a first configuration shown in FIGS. 4, 5, 7 and 8, held integral with coil 10, by the retaining member 7 wound around it. Specifically, the movable member 8 bears against an abutment area 14 of coil 10, and movable member 9 bears against another abutment area 15 of coil 10. In this configuration, there is not sufficient space for the plunger 3 of contact means 3, 4, 5 of switching device 2 of FIGS. 1 to 3 to move through. This so-called non-activation configurations thus prevents the displacement of contact means 3, 4, 5.

Figure 6:
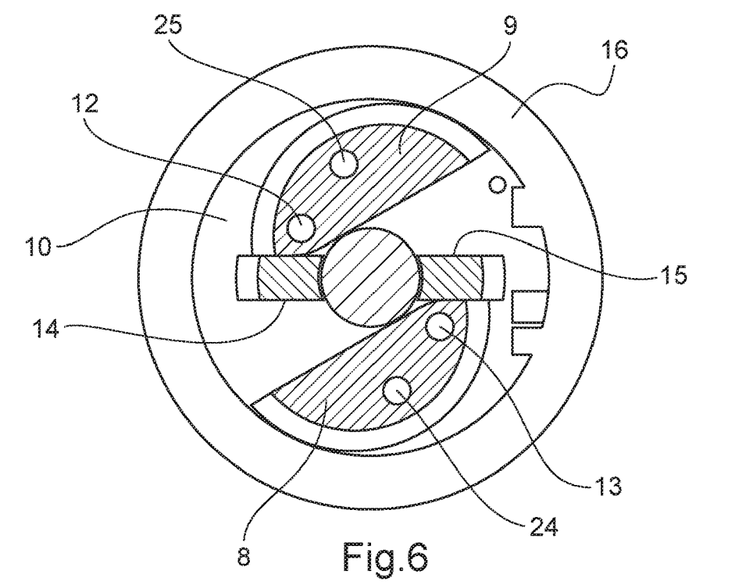
FIG. 6 is a diagrammatic representation of the actuation device of FIG. 4, in cross-section and after activation.
Figure 9:
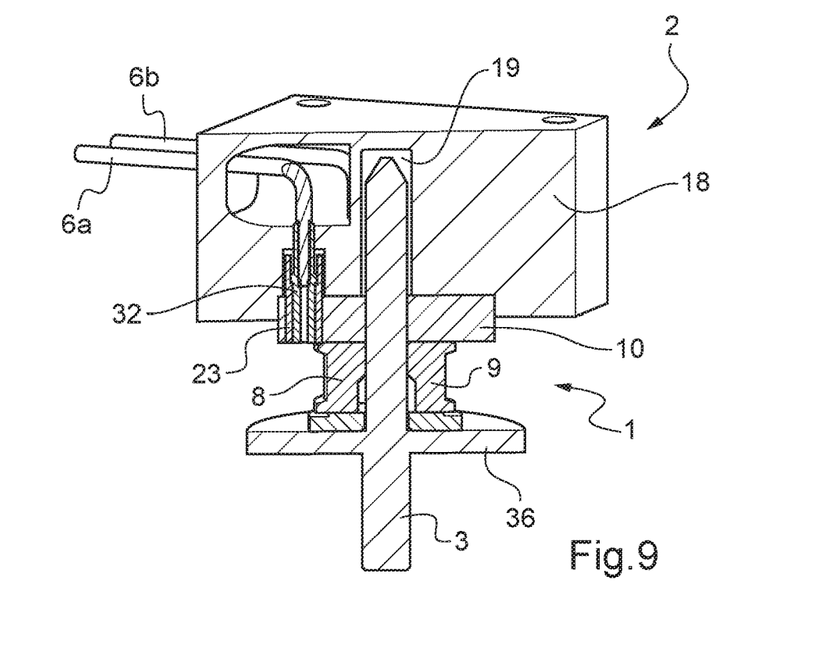
FIG. 9 is a diagrammatic representation of the actuation device of FIG. 4 installed in the switching device of FIG. 1, in cross-section and after activation.

Furthermore, in a second so-called activation configuration, shown in FIGS. 6 and 9, the movable members 8, 9 are no longer held by the retaining member, and are each rotated about an axis 12, 13 while remaining integral with the coil 10 via their respective axes of rotation 12, 13, which frees up a through-space which is sufficient to allow the plunger 3 of contact means 3, 4, 5 of the switching device 2 of FIGS. 1 to 3 to penetrate thereinto. Thus, this activation configuration enables the displacement of the contact means 3, 4, 5.

Two pins 12, 13 passing longitudinally through the coil 10 ensure the movable members 8, 9 are respectively rendered integral with coil 10, and form the axes of rotation 12, 13 of these movable members 8, 9.

Thus, the rotational movement of each of the movable members 8, 9 relative to their respective pins 12, 13 consequently allows a passage to be opened up for the plunger 3 of switching device 2, in coil 10 of actuation device 1.

The through-space in question is a preferably substantially cylindrical space, more generally centered on the central axis of coil 10. The two pins 12, 13 are arranged parallel to this through-space, and symmetrically to each other with respect to the passage. Once configured in this way, when the first contact position T2T1 is switched to the second contact position T1T3, the regions of each of the movable members 8, 9 or jaws 8, 9 that are furthest from their respective pins 12, 13 move away from each other, thereby making it possible to free the through-space while still retaining the movable members or jaws 8, 9 integral with the coil 10.

Figure 5:
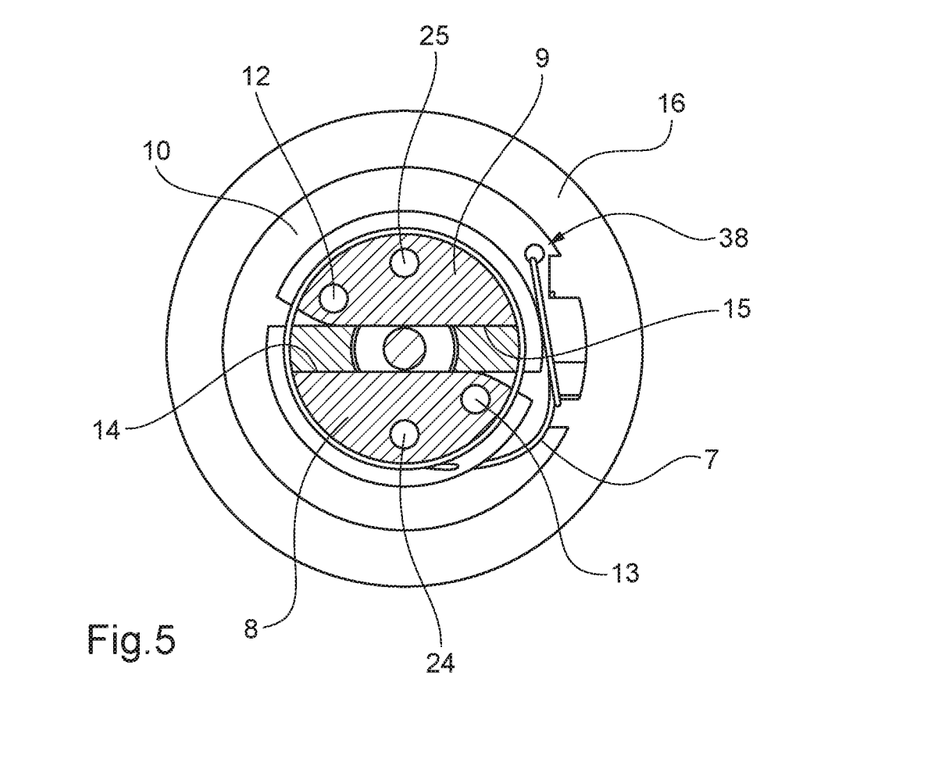
FIG. 5 is a diagrammatic representation of the actuation device of FIG. 4, in cross-section and before activation.

As shown in FIGS. 5 and 6, a hole 24, 25 may be provided in each of the movable members 8, 9 adapted to allow the movable members 8, 9 to be held against the abutment surfaces 14, 15 of the coil 10 during the assembly of actuation device 1, even if the movable members 8, 9 are already held by the pins 12, 13.

Switching from the non-activation configuration (FIG. 5) to the activation configuration (FIG. 6) is obtained by an electric current of a certain intensity, supplied by the current-supply wire 6a (or alternatively by the wire 6b which can also make it possible to supply the current) coming from current sensor 6a, 6b which is connected to one, 39, of the ends of retaining member 7 of the wire type wound around the movable members or jaws 8, 9. The other end, 38, of the retaining member 7 is connected to the coil 10, as can be seen more precisely in FIG. 5.

Figure 7:
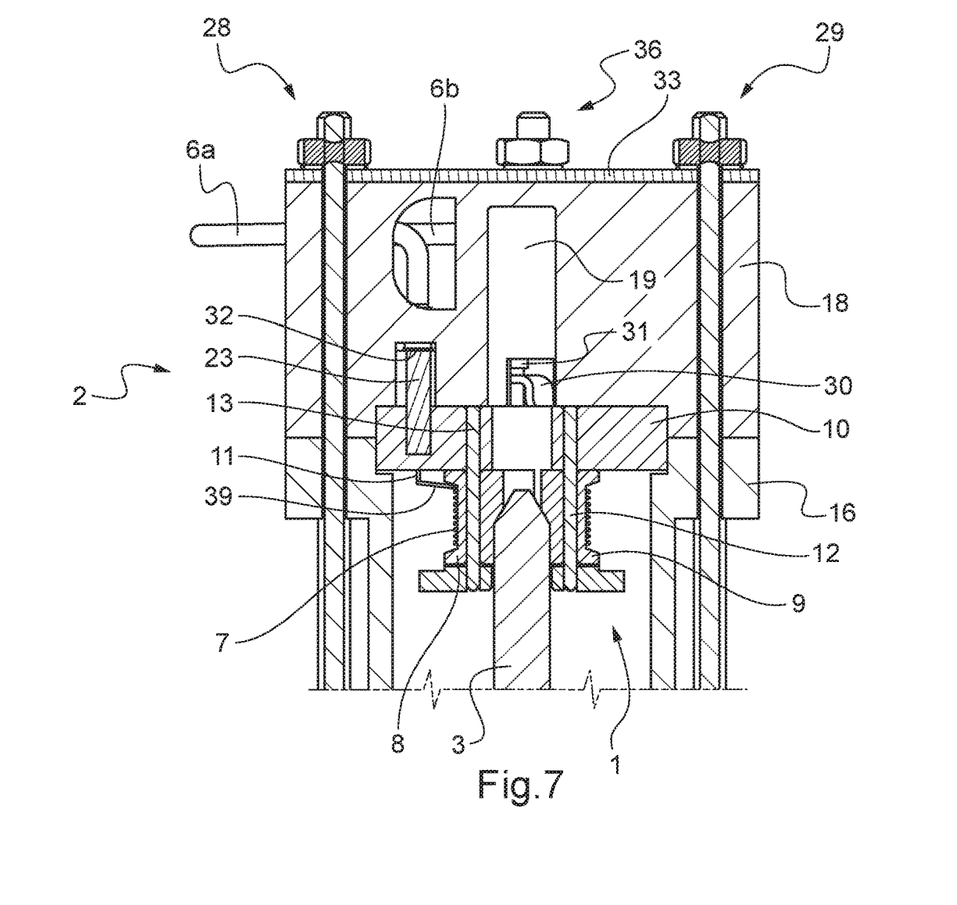
FIG. 7 is a diagrammatic representation of the actuation device of FIG. 4 installed in the switching device of FIG. 1, in cross-section and before activation.
Figure 8:
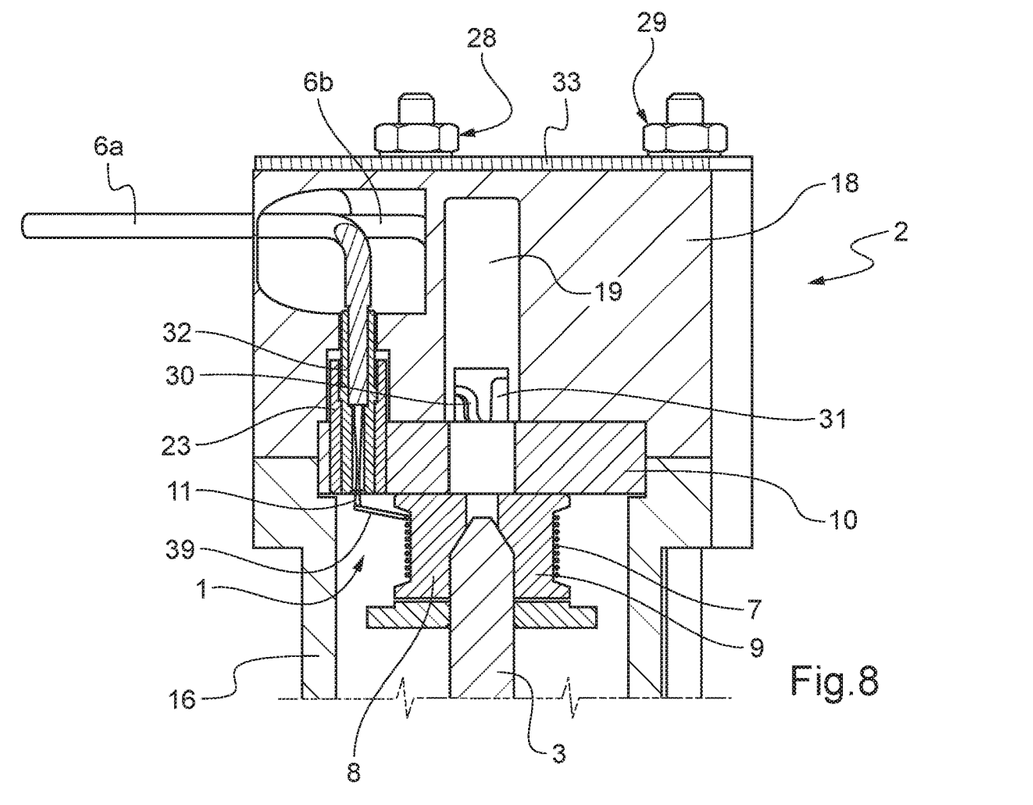
FIG. 8 is another cross-sectional view of the actuation device of FIG. 4 installed in the switching device of FIG. 1, before activation.

As can be seen more precisely in FIGS. 7 and 8, the retaining member 7 is connected to this current supply wire 6a of current sensor 6a, 6b via a fuse wire 11, through a connecting member 32, connecting member 32 being housed in the isolating member 23, the latter being housed inside the coil 10. When a current of a certain intensity is supplied by the current-supply wire 6a (or, alternatively, the wire 6b) of current sensor 6a, 6b, the fuse wire 11 melts, thereby releasing the retaining member 7 at its end 39. The latter unwinds in order to release, in its turn, the movable members or jaws 8, 9 and allow them to rotate about the pins 12, 13, under the thrust of plunger 3 forced by the resilient return means 17, to the activation configuration of FIG. 6

The fuse wire 11 preferably takes the form of a loop 11, which makes it possible to obtain good control of the location at which the fuse wire will break, while ensuring good mechanical strength as long as the current sensor 6a, 6b is not carrying the triggering or activation current for release of retaining member 7. Thus, this configuration of the looped fuse wire 11 allows targeted and easy implementation and constitutes a good compromise between on the one hand, electrical and mechanical strength and on the other hand effective release of the retaining member 7 at its end 39.

The isolating member 23 and the assembly of the current supply wire 6a of current sensor 6a, 6b via the connecting member 32 within isolating member 23 and the coil 10 do not allow any movement of the assembly comprising current supply wire 6a, connecting member 32, isolating member 23, coil 10, fuse wire 11; in particular, the shape of this isolating member 23 is adapted to a counterbore of coil 10 in order to prevent its rotation. Furthermore, the bonding of connecting member 32 and its crimped shape make it possible to avoid rotation of the connecting member 32 in isolating member 23.

Damage to the loop of fusible wire 11 retaining the retaining member 7 is thus avoided.

Furthermore, the through holes for the passage of the wires of current sensor 6a, 6b in cover 18 and their path which is elbowed substantially at 90°, provide a second level guarantee that these wires 6a, 6b will not rotate.

Thus, the pulling of retaining member 7 via its end 39 on the loop of fuse wire 11 tends to press the assembly comprising wire 6a, connecting member 32, and isolating member 23 against the coil 10.

Furthermore, the counterbore in the cover 18 receiving and serving as a passage for the wire 6a of current sensor 6a, 6b provides a second level guarantee of axial location of the assembly comprising wire 6a, connecting member 32, and isolating member 23.

The retaining member 7 is, for its part, mechanically retained by its other end 38 to coil 10. In this way, the electrical path (both series and parallel) of actuation device 1 comprises the current supply wire 6a and the fuse wire 11 (the connecting member 32 connecting wire 6a and fuse wire 11), retaining member 7, coil 10, the movable members or jaws 8, 9, the pins 12, 13, the conductive tab 30 and the return wire 6b. Such an actuation device 1 is referred to as self-supported.

Furthermore, since the fuse wire loop 11 is very close to the two movable members 8, 9, the distance between the connection of the retaining member 7 and the fuse wire loop11 is reduced, which makes it possible to limit the risk of interference from end 39, or engagement member, of retaining member 7 in body 16 during uncoiling of retaining member 7 upon it being released by the fuse wire loop 11.

All the metal parts can thus be connected to non-floating and accessible potentials, and more specifically:
the potentials on wires 6a, 6b of the current sensor, before and after activation, for the annular force distribution member 41, resilient return means 17, plunger 3, movable members 8, 9, pins 12, 13, coil 10, retaining member 7, current sensor 6b, 6a, connecting member 32, conductive tab 30 (and screw 31) and the fuse wire 11,
the potentials of the power circuit at the interface with contact terminals T1, T2 and T3, before and after switching for contact elements 20, 21, 22, contact terminals T1, T2, T3, and distributor member 5,
ground potential, for example, for the securing means 28, 29 and 34, 35, support plates 33, 40 making for mechanical cohesion of the assembly.

The present description is given by way of example and is not limiting of the invention, in particular with regard to the shape of the various components of the actuation device 1 and of the switching device 2.

In particular, the shape of the movable members 8, 9 is not limited to that shown in the drawings, as long as it is possible for them to move from the non-activation configuration to the activation configuration without ceasing to be integral with coil 10.

The invention claimed is:

1. An actuation device for activating switching in a switching device of the type having electrical contact means movable between a first electrical contact position (T2T1), and a second electrical contact position (T1T3), the actuation device comprising a current sensor, a retaining member and at least two movable members integral with a coil, and being capable of changing over, when a current is sensed by the current sensor, from a non-activation configuration in which the movable members are held by the retaining member in a first position for preventing movement of the electrical contact means of the switching device, to an activation configuration in which the movable members are no longer held by the retaining member in said first position and are located in a second position allowing the electrical contact means of the switching device to change position,
wherein the coil comprises a through-space for at least a part of the electrical contact means of the switching device, and wherein the movable members are each movable in rotation about an axis so as to free up, in said second position, said through-space, while remaining integral with the coil.

2. The actuation device according to claim 1, wherein the coil has an abutment region for each of the movable members, and, in the first position, the movable members are maintained in abutment on their respective abutment regions by the retaining member.

3. The actuation device according to claim 1, wherein axes of the two movable members are formed by pins integral with the coil.

4. The actuation device according to claim 3, wherein the through-space is centered on a central axis of the coil, in which the two pins are arranged parallel to said through-space and mutually symmetrically with respect to said through-space, and in that the two movable members take the form of two jaw members such that during a changeover from the first position to the second position, the respective regions of the two jaw members furthest from the respective pins move away from each other to free up access to said through-space.

5. The actuation device according to claim 1, wherein the current sensor comprises a current-supply wire, and the retaining member is of a wire type, connected by one of its ends to said coil, wound around the movable members and connected by its other end to the current-supply wire of the current sensor by a fuse wire in the first position, such that when the current is sensed by the current sensor, the fuse wire melts and releases the corresponding end of the retaining member in order to allow the passage of the movable members to adopt the second position.

6. The actuation device according to claim 5, wherein the fuse wire exhibits a loop configuration.

7. The actuation device according to claim 5, wherein the fuse wire is connected, to the current-supply wire of the current sensor through the coil, and an electrically isolating member is interposed between, firstly, the assembly comprising the fuse wire, optionally a connecting member, the current-supply wire of the current sensor and, secondly, the coil.

8. A switching device comprising a body in which electrical contact means are accommodated movable in the body between a first electrical contact position (T2T1), and a second electrical contact position (T1T3), wherein the switching device further comprises an actuation device according to claim 1 housed in the body, so as to enable, when said actuation device is in the activation configuration, displacement of the electrical contact means from the first, T2T1, to the second, T1T3, electrical contact position.

9. The switching device according to claim 8, wherein the body has a longitudinal axis, the electrical contact means extending longitudinally in the body, and in that the actuation device is arranged in the body such that the through-space for the at least one part of the electrical contact means extends longitudinally.

10. The switching device according to claim 9, wherein the electrical contact means comprise a plunger able to move longitudinally in the through-space to displace the electrical contact means from the first, T2T1, to the second, T1T3, electrical contact position.

11. The switching device according to claim 10, wherein it comprises resilient return means, which are connected, firstly, to the body, and, secondly, to the electrical contact means, the resilient return means being mounted in a relaxed position when the electrical contact means are in the second, T1T3, position of electrical contact and in an active position when the electrical contact means are in the first, T2T1, electrical contact position, so as to allow automatic passage of the electrical contact means from the first, T2T1, to the second, T1T3, electrical contact position under the influence of the resilient return means from the active position thereof to the relaxed position thereof.

12. The switching device according to, claim 10, wherein the electrical contact means include a distributor member connected to the plunger by an electrically non-conductive base, said distributor member being in contact with a first (T2) and a second (T1) electrical contact terminals in the first electrical contact position, T2T1, and in contact with the second (T1) and a third (T3) electrical contact terminals in the second electrical contact position, T1T3.

13. The switching device according to claim 12, wherein an end of said distributor member oriented in the direction of movement of said electrical contact means from the first to the second electrical contact position, has a radially reduced profile with respect to a longitudinal axis of the body, so as to promote engagement of said distributor member with said third electrical contact terminal, in contact therewith.

14. The switching device according to claim 12, wherein it comprises contact elements made of electrically conductive deformable material, arranged respectively in contact with the electrical contact terminals, and in contact with said distributor member as a function of its movement from the first to the second electrical contact position to facilitate electrical contact between said distributor member and one or the other of said electrical contact terminals.

15. The switching device according to claim 14, wherein a diameter of a portion of the electrically non-conductive base facing a contact member in contact with the third contact terminal, which is not in contact with said distributor member in the first contact position, is adapted to cause said third contact terminal to adopt a self-centered position on the electrically non-conductive base and perpendicular to an axis of said electrical contact means, so as to obtain a slidable, centered, abutment-type assembly.

16. The switching device according to claim 8, wherein the actuation device is arranged at one end of the body, said end being closed by a first cover.

17. The switching device according to claim 16, wherein the first cover is provided with a clearance space into which a through-space in said coil of the actuation device opens, so as to allow said at least one part of the electrical contact means of the switching device to pass through said actuation device right up and into said clearance space.

18. The switching device according to claim 16, wherein the body is closed, at its end opposite the end closed by the first cover, by a second cover provided with a cavity, and in that the said distributor member is provided at its end facing the second cover, with a centering device which can be accommodated in said cavity of the second cover.

19. The switching device according to claim 18, wherein the centering device is provided with cooperation means, capable of enabling co-operation with an assembly member to enable assembly of the electrical contact terminals, T3, T1, T2 on the distributor member without damaging the said contact elements and the moving of said electrical contact means from the second, T1T3, to the first, T2T1, electrical contact position.

20. The switching device according to claim 8, wherein, in the first contact position, in the second contact position, and during the changeover from the first to the second contact position, all the metal parts of said device are connected to one electrical potential.

21. An isolation device for isolating at least one determined cell of a battery which comprises a plurality of cells connected in series, said isolation device being adapted to be connected to said battery, wherein the isolation device further comprises a switching device according to claim 8, and in that it is connected to the current sensor of said actuation device, so as to allow the switching device to pass from a first electrical contact position, in which the determined cell is connected in series with other cells, to a second electrical contact position, in which the determined cell is bypassed and is no longer connected in series with the other cells.

22. A battery comprising one or more cells connected in series, wherein it is provided with the isolation device according to claim 21.

\* \* \* \* \*